(12) United States Patent
Sudhir

(10) Patent No.: US 11,297,981 B2
(45) Date of Patent: Apr. 12, 2022

(54) MULTIFUNCTIONAL FOOD PROCESSOR

(71) Applicant: Sanandan Sudhir, Rohini (IN)

(72) Inventor: Sanandan Sudhir, Rohini (IN)

( * ) Notice: Subject to any disclaimer, the term of this patent is extended or adjusted under 35 U.S.C. 154(b) by 343 days.

(21) Appl. No.: 16/032,877

(22) Filed: Jul. 11, 2018

(65) Prior Publication Data

US 2018/0317715 A1 Nov. 8, 2018

Related U.S. Application Data

(63) Continuation-in-part of application No. 15/225,387, filed on Aug. 1, 2016, now Pat. No. 10,022,021, which is a continuation-in-part of application No. 13/991,163, filed as application No. PCT/IN2011/000882 on Dec. 21, 2011, now Pat. No. 9,402,511.

(30) Foreign Application Priority Data

Dec. 21, 2010 (IN) .......................... 3051/DEL/2010

(51) Int. Cl.
| | |
|---|---|
| *A47J 44/00* | (2006.01) |
| *A47J 43/046* | (2006.01) |
| *A47J 43/044* | (2006.01) |
| *A47J 27/00* | (2006.01) |
| *A47J 36/32* | (2006.01) |

(52) U.S. Cl.
CPC .............. *A47J 44/00* (2013.01); *A47J 27/004* (2013.01); *A47J 36/321* (2018.08); *A47J 43/044* (2013.01); *A47J 43/046* (2013.01)

(58) Field of Classification Search
CPC ........ A47J 44/00; A47J 43/046; A47J 43/044; A47J 27/004; A47J 36/321

USPC ........... 99/328, 330, 357; 219/388, 683, 690
See application file for complete search history.

(56) References Cited

U.S. PATENT DOCUMENTS

| | | |
|---|---|---|
| 3,789,178 A | 1/1974 | Harhen |
| 3,965,352 A | 6/1976 | Hirai |
| RE31,637 E | 7/1984 | Yoshida |
| 5,177,333 A | 1/1993 | Ogasawara |

(Continued)

OTHER PUBLICATIONS

USPTO Office Action dated Nov. 18, 2015 issued for Parent U.S. Appl. No. 13/991,163.

(Continued)

*Primary Examiner* — Thien S Tran
(74) *Attorney, Agent, or Firm* — D'Ambrosio & Menon, PLLC; Usha Menon

(57) ABSTRACT

A multifunctional food processor is disclosed, comprising: a grinder housing with a mechanism for driving a grinding blade; and a bottom pan that is detachably attached to grinder housing, and incorporates the grinding blade. Bottom pan, when attached to grinder housing, gets coupled to the mechanism for driving the grinding blade. A top pan is provided to cover the bottom pan, and is coupled with at least one magnetron or microwave producing device that acts as a source of microwaves for heating contents of the bottom pan. The bottom pan also incorporates one or more induction coils to heat the contents of the bottom pan by induction. The magnetron or microwave producing device and the induction coils allow contents of the bottom pan to be heated in addition to any one or more of stirring, blending and grinding.

15 Claims, 11 Drawing Sheets

(56) References Cited

U.S. PATENT DOCUMENTS

| | | | |
|---|---|---|---|
| 5,260,478 A | 4/1993 | Lee | |
| 5,252,797 A * | 10/1993 | Komatsu | H05B 6/642 219/729 |
| 5,466,912 A * | 11/1995 | Dornbush | A47J 36/12 126/21 A |
| 5,632,921 A * | 5/1997 | Risman | H05B 6/707 219/750 |
| 5,821,507 A | 10/1998 | Sasaki | |
| 5,967,021 A * | 10/1999 | Yung | A21B 7/005 366/144 |
| 6,011,249 A * | 1/2000 | Chung | H05B 6/6411 219/685 |
| 6,375,102 B1 * | 4/2002 | Bouleau | A47J 43/046 241/37.5 |
| 6,559,882 B1 | 5/2003 | Kerchner | |
| 6,680,467 B1 | 1/2004 | Whipple | |
| 6,815,644 B1 | 11/2004 | Muegge | |
| 2005/0236388 A1 | 10/2005 | Goranson | |
| 2005/0258170 A1 * | 11/2005 | Cheng | A47J 36/06 219/680 |
| 2006/0209627 A1 * | 9/2006 | McGill | A47J 43/0761 366/205 |
| 2007/0251936 A1 | 11/2007 | Nam et al. | |
| 2009/0139981 A1 * | 6/2009 | Moon | A47J 37/0623 219/490 |
| 2009/0196964 A1 * | 8/2009 | Verheist | A47J 39/006 426/234 |
| 2009/0212044 A1 | 8/2009 | Stanton | |
| 2010/0301034 A1 | 12/2010 | Greenwood | |

OTHER PUBLICATIONS

USPTO Office Action dated Feb. 10, 2017 issued for Parent U.S. Appl. No. 15/225,387.
USPTO Office Action dated Oct. 30, 2017 issued for Parent U.S. Appl. No. 15/225,387.

* cited by examiner

MULTIFUNCTIONAL FOOD PROCESSOR

CROSS REFERENCE TO RELATED APPLICATIONS

This application is a continuation-in-part of and claims priority to U.S. Ser. No. 15/225,387 filed on Aug. 1, 2016 which is a continuation in part of and claims priority to U.S. Ser. No. 13/991,163 filed Apr. 9, 2014, which is a U.S. National Stage filing under 35 U.S.C. 371 of PCT application number PCT/IN2011/000882 filed on Dec. 21, 2011, claiming benefit of Indian application no. 3051/DEL/2010, filed Dec. 21, 2010, the contents of which are incorporated by reference herein.

TECHNICAL FIELD

The present disclosure relates to an electrically operated mixer grinder with microwave, which is capable of blending, mixing, stirring, and simultaneously cooking food in a single container, using a secondary heat source.

BACKGROUND

Background description includes information that may be useful in understanding the present invention. It is not an admission that any of the information provided herein is prior art or relevant to the presently claimed invention, or that any publication specifically or implicitly referenced is prior art.

Different types of food processors are available at present in the global market; for example, juicer, grinder, blender, soup maker etc. Using a food processor is the easiest way to prepare juices, which have in recent years become very popular as they provide an easy way to consume lots of nutrients without having to eat whole fruits and vegetables.

In order to prepare foods or vegetables which are both stirred and heated, some blending or stirring machines that are available in market, also include a heat source in contact with a container/vessel in which a blade is mechanically rotated. For example Patent document U.S. Pat. No. 6,318,247 B1 discloses an appliance for preparation of heated and stirred beverages and foods, the appliance has a vessel and a base, with a mixing element rotationally driven within the vessel by magnetic coupling with a driving magnet array attached to an electric motor and covered by a cap. The vessel bottom is preferably a cast metal piece with internal cavities in which one or more heating elements are mounted whereby a liquid in the vessel is simultaneously heated and stirred or whipped.

Likewise, Patent documents US 20050045671A1 and US 20050045671A1 disclose devices incorporating heat sources located at the bottom of the vessel. However, locating the heat source at bottom of the vessel is disadvantageous as it leads to poor heat distribution throughout the liquid or food in the vessel of the mixer/blender. Besides, they use electrical conduction to heat the food. Food can leak into the electrical parts and cause hazardous short circuiting. Use of electric power also takes a lot of time in cooking process, extending up to 15-20 min and can be very expensive. It would therefore be advantageous if the mixer/blender device can incorporate a heat source other than electric conduction, like a microwave, that can evenly and speedily distribute the heat in food item held within vessel of the mixer/blender/grinder.

Therefore, there is a need of an improved multifunctional automatic food processor which can stir, blend, grind and cook the food in a single device within short period of time according to user's need.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY

Aspects of the present disclosure relate to a multifunctional automatic food processor which can stir, blend, grind and cook the food in a single device. The multifunctional food processor of the present disclosure comprises: a grinder housing having a mechanism for driving a grinding blade; and a bottom pan adapted to be detachably attached to the grinder housing, and incorporating the grinding blade. The bottom pan, when attached to the grinder housing, gets coupled to the mechanism for driving the grinding blade. The food processor further includes a top pan adapted to cover the bottom pan, and wherein the top pan is coupled with at least one microwave producing device, such as a magnetron, that acts as a source of microwaves, thereby allowing contents of the bottom pan to be heated in addition to any one or more of stirring, blending, grinding.

In an aspect, the food processor further includes: a base plate; a bottom housing placed over the base plate; and a top housing pivotally coupled to the bottom housing and housing the at least one magnetron or microwave producing device. The top pan is attached to the bottom housing, and the pivotally attached top housing moves between a raised position in which the top housing rests on a resting face of the bottom housing, and a lowered position in which the top pan attached to the bottom housing rests over the bottom pan, and covers the bottom pan.

In an aspect, in the lowered position of the top housing and the attached top pan, the bottom pan and the top pan resting on the bottom pan, form an enclosed space for holding food items, and for any or a combination of heating, stirring, blending, and grinding.

In an aspect, the top pan is coupled to the top housing through a wave guide that guides microwaves generated by the at least one magnetron or microwave producing device for their transfer from the at least one magnetron or microwave producing device to the bottom pan.

In an aspect, the bottom pan and the top pan are of a hemispherical shape to enable reflection of microwaves inside the bottom pan and the top pan for efficient cooking.

In an aspect, the bottom pan is detachably attached to the grinder housing through a plurality of locking legs provided on a bottom side of the bottom pan, and a plurality of corresponding locking grooves provided on a top surface of the grinder housing.

In an aspect, the grinding blade is driven by a motor located in the grinder housing.

In an aspect, the motor can be fixed in the grinder housing coaxially with the grinding blade.

In an aspect, the motor can alternatively fixed in the grinder housing at a position away from the grinding blade, and drive from the motor to the grinding blade can be transmitted through a belt.

In an aspect, the food processor can include one or more power transformers, located within the bottom housing, for regulating input power to the at least one magnetron or microwave producing device, and to the motor for driving a mixer grinder blade.

In an aspect, the top housing can incorporate a display screen on a front face for user interface.

In an aspect, the food processor can be configured to allow simultaneous or iterative use of any or a combination of heating, stirring, blending and grinding.

In an aspect, the top housing can comprise a plurality of vents for a fan that is configured in the top housing.

In an aspect, the top housing can be pivotally coupled with the bottom housing by means of a hinge.

In an aspect, top of the bottom pan can include a choke for preventing leakage of microwaves during working.

In an aspect, the food processor can be configured as a remotely operable device through any or a combination of Internet, Wi-Fi, Bluetooth, Zigbee, and Near-Field Communication (NFC).

In an aspect, the food processor can include a bottom pan that incorporates one or more induction coils to heat the contents of the bottom pan by induction. The at least one magnetron or microwave producing device and the plurality of induction coils can allow the contents of the bottom pan to be heated in addition to any one or more of stirring, blending and grinding.

In an aspect, the bottom pan having one or more induction coils can comprises a bottom pan enclosure and a bottom pan resting plate. The one or more induction coils can be accommodated within one or more resting grooves on periphery of the bottom pan enclosure such that the one or more induction coils are sandwiched between the bottom pan enclosure and the resting plate.

In an aspect, electric power to the one or more induction coils can be provided through the plurality of locking legs. When the bottom pan is locked with the grinder housing, the plurality of locking legs get connected with a source of electric power in the grinder housing.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms are used herein. To the extent a term used in a claim is not defined, it should be given the broadest definition persons in the pertinent art have given that term as reflected in printed publications and issued patents at the time of filing.

In aspect, the present disclosure relates to a food processor device having a mixer and grinder along with additional heat source (microwave and induction) for grinding, cooking, emulsifying, steaming, kneading, whipping, blending, mixing, stirring and chopping the vegetables, fruits and meats at controlled speed.

In aspect, proposed food processor device offers manual, automatic and guided cooking and the device can act as a mixer, grinder, stirrer, blender and juicer with and without use of heat source as per user's need.

In aspect, blade can run at slow speed and act as a stirrer and distributing the heat evenly during cooking. In another aspect, add all ingredients at once in a device and blade can run at higher speed and act as a grinder for making a juice and at the same time controlled heat source (microwave and induction) can heat the contents as per need. Two cooking options, i.e. induction and microwave reduces the cooking time to $\frac{1}{4}^{th}$ of the actual time required.

The proposed device is very easy to use and clean. As device is configured with electronics and user graphic interface, user can check progress of soup making/food processing on the digital platform and program the device as per need.

Figure 1A:
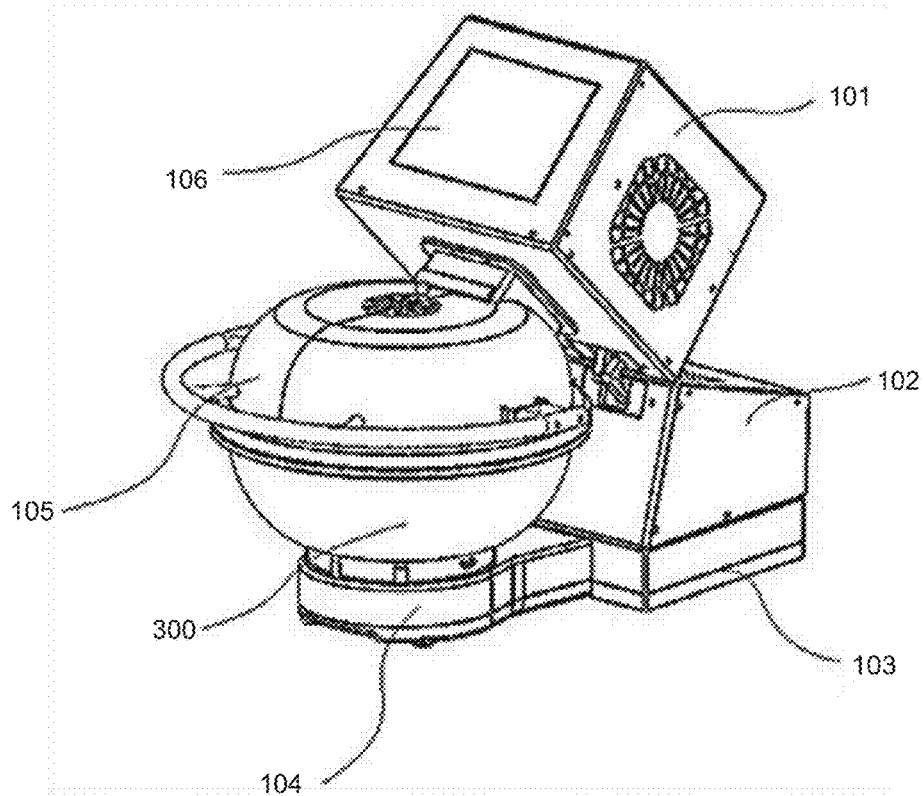
FIGS. 1A and 1B illustrate exemplary perspective view and side view respectively of the proposed mixer grinder device with microwave, in accordance with embodiments of the present disclosure.
Figure 1B:
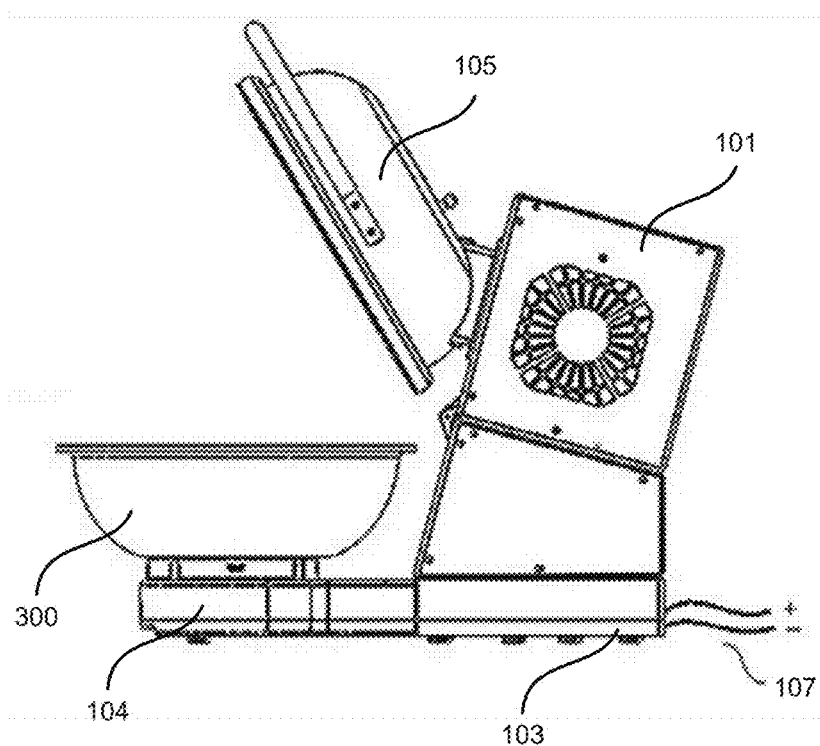

FIGS. 1A and 1B illustrate exemplary perspective view and side view respectively of the proposed mixer grinder device with microwave. As shown, the mixer grinder device with microwave incorporates a top housing 101, a bottom housing 102, a base plate 103, a grinder housing 104, a top pan 105 and a bottom pan 300. The top housing 101 comprises a magnetron or microwave producing device which provides microwaves as a heat source to the top pan 105. The top housing 102 can have one or more fans for forced cooling of the magnetron or microwave producing device, air vents to circulate the air, and electronics components for controlling power supply to the magnetron or microwave producing device. The bottom housing 102 can rest on the base plate 103, and can comprise one or more power transformer for regulating input power to the magnetron or microwave producing device, and additionally to a motor provided in the device for driving a mixer grinder blade (also referred simply as mixer blade) in the bottom pan 300. The grinder housing 104 comprises mechanism for driving the mixer blade and is configured to detachably holding the bottom pan 300. The bottom pan can be a container of hemisphere shape having internal cavity for storing and processing the food items and beverages. The hemispherical shape of the bottom pan 300 enables reflection of microwaves inside the bottom pan 300 and the top pan 105 for efficient cooking, and for this reason the top pan 105 can also be of hemispherical shape.

The top pan 105 is attached with the top housing 101 through wave guide for providing a path for microwaves generated by the magnetron or microwave producing device.

In an embodiment, the top housing 101 can include one or more display screens such as LCD on a front face of the top housing 101 as a user interface. Electric power for the magnetron or microwave producing device and the motor to run the mixer grinder blade can be received in the base plate 103 through input power cables 107.

In an embodiment, the mixer grinder can be configured as a remotely operable apparatus through any or a combination of Internet, Wi-Fi, Bluetooth, ZigBee, and Near-Field Communication (NFC).

Figure 2A:
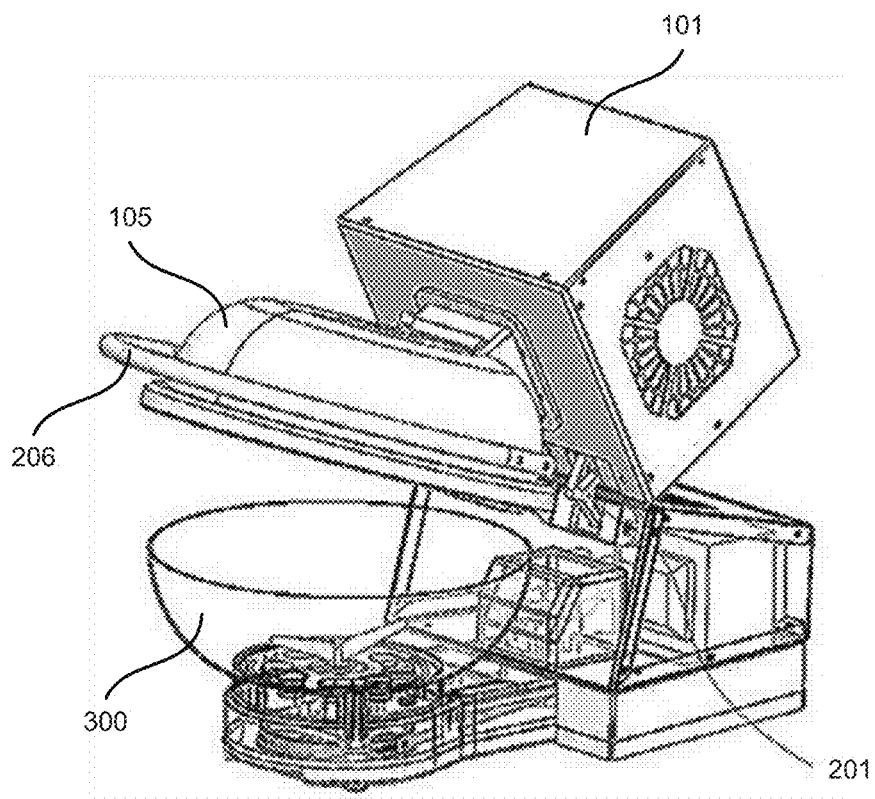
FIGS. 2A and 2B illustrate exemplary perspective views of the proposed mixer grinder device with microwave, respectively showing open and closed positions of top pan, in accordance with an embodiment of the present disclosure.
Figure 2B:
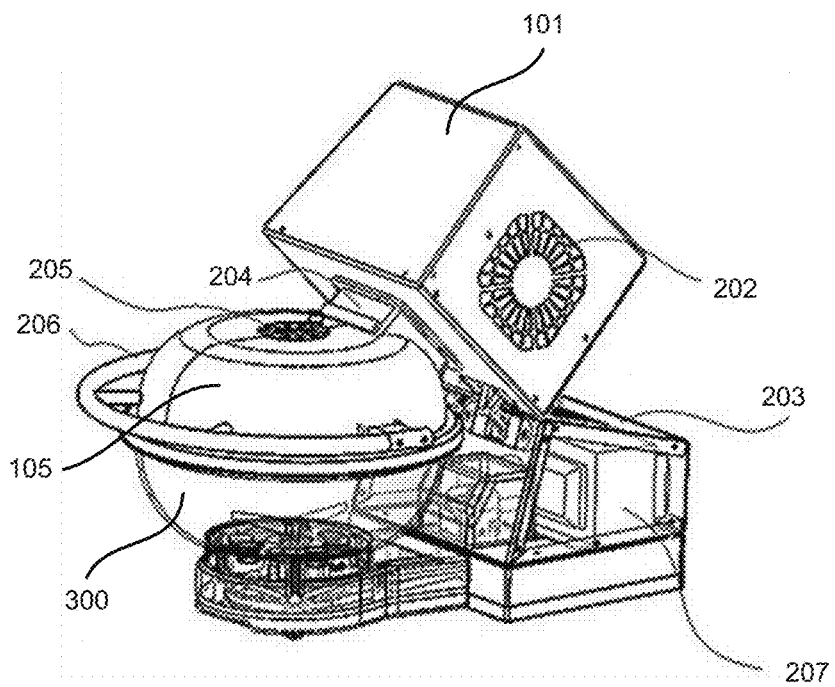

FIGS. 2A and 2B illustrate exemplary perspective views of the proposed mixer grinder device with microwave, respectively showing open and closed positions of top pan, wherein the closed position of the top pan 105, the mixer grinder gets coupled to with the microwave heat source to heat contents of the bottom pan 300. As shown the top housing 101 is coupled with bottom housing 102 through a hinge 201 for pivotal movement of the top housing 101, along with the top pan 105, between a raised position and a lower position. In the raised position of the top housing 101 the top pan 105 is lifted off the bottom pan 300, and the top housing 101 rests on a top housing resting face 203. In the lowered position of the top housing 101 the top pan 105 rests on the bottom pan 300, thereby closing the bottom pan 300 to create an enclosure for various operations like grinding, mixing, blending, stirring as well as cooking by heating on the contents held within the bottom pan 300. The top pan 105 includes a steam vent 205 for allowing generated steam to escape during cooking.

As shown, the top housing incorporates air vents 202 for air circulation using one or more fans. The top housing 101 and the top pan 105 are coupled through a wave guide 204. The wave guide 204 provides a space and guides the microwaves for their transfer from the magnetron or microwave producing device to the bottom pan 300 without leakage for heating the contents in the enclosure between the top pan 105 and the bottom pan 300. A handle 206 is provided on the top pan 105 for ease of opening and closing the device. A power transformer 207 is provided inside the bottom housing 102 for stepping up and stepping down the input power as per need of the magnetron or microwave producing device.

Figure 3A:
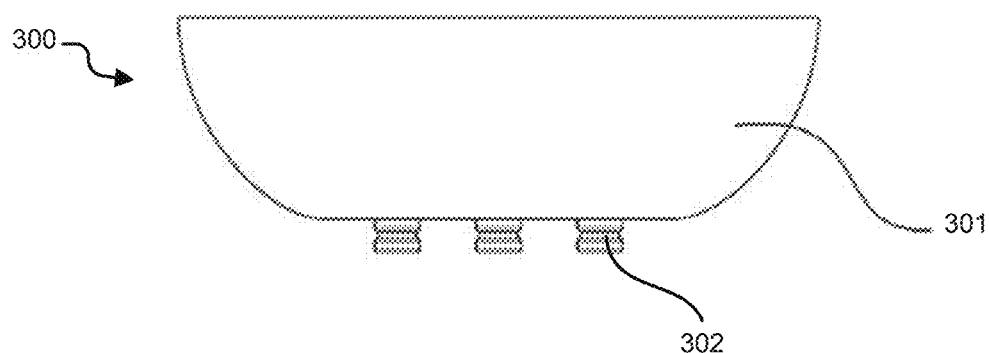
FIGS. 3A and 3B illustrate exemplary side view and perspective view respectively of bottom pan, in accordance with an embodiment of the present disclosure.
Figure 3B:
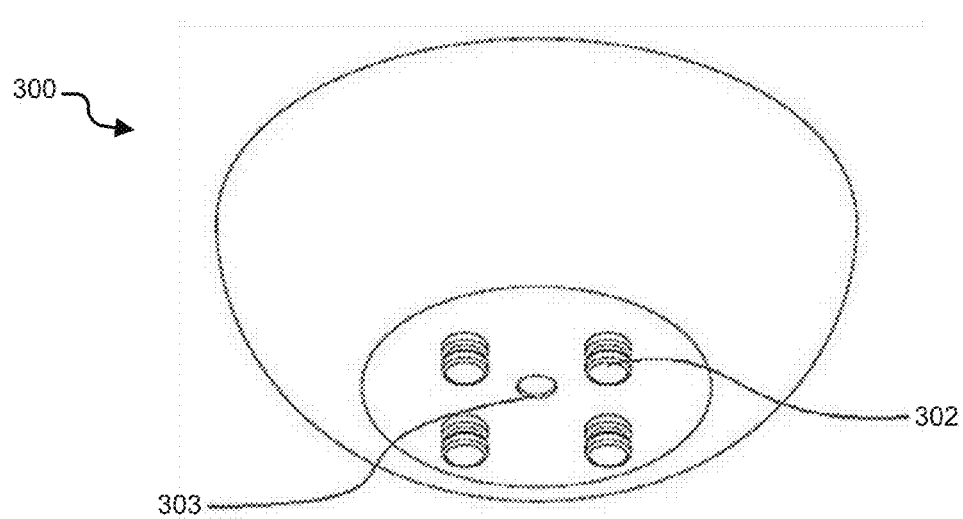

FIGS. 3A and 3B illustrate exemplary side view and perspective view respectively of the bottom pan 300, in accordance with an embodiment of the present disclosure. As shown, the bottom pan 300 can be made of a metal, and can be of hemispherical shape. Inner hollow 301 of the bottom pan 300 can be used to store the food items and beverages for mixing, grinding and making juice as per need. Bottom side of the bottom pan 300 can incorporate a plurality of locking legs 302 for locking the bottom pan 300 with the grinder housing 104. Each of the locking legs 302 can incorporate grooves that engage with the grinder housing 104 to lock the bottom pan 300 with the grinder housing 104. There can be a through hole 303 at center of the bottom pan 300 for fitment of a shaft to drive mixer/grinder blades.

Figure 4A:
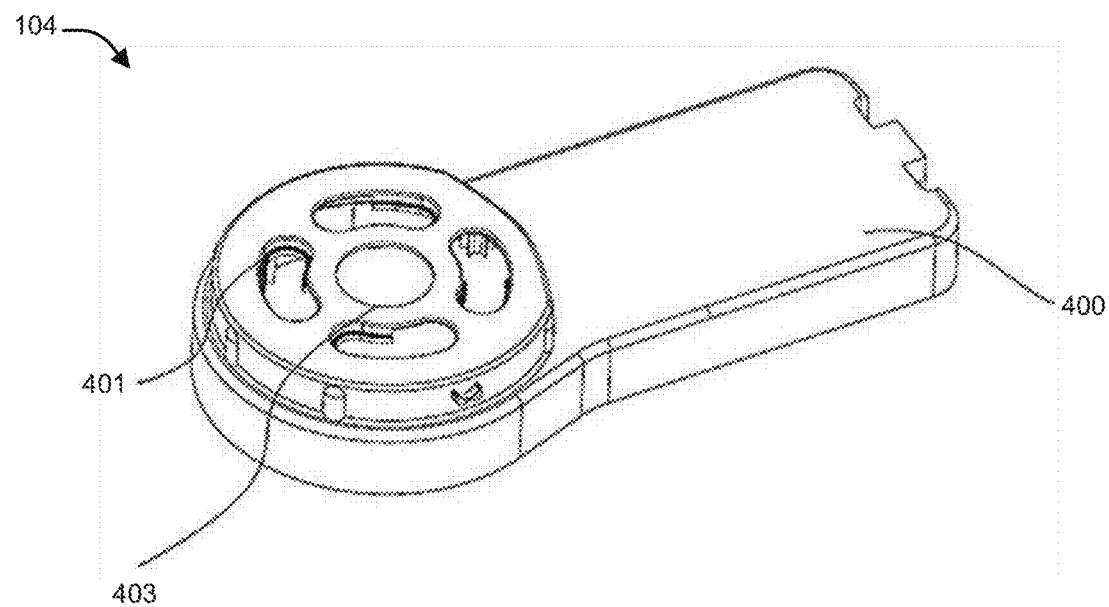
FIGS. 4A and 4B illustrate exemplary perspective view and top view of top panel of grinder housing, in accordance with an embodiment of the present disclosure.
Figure 4B:
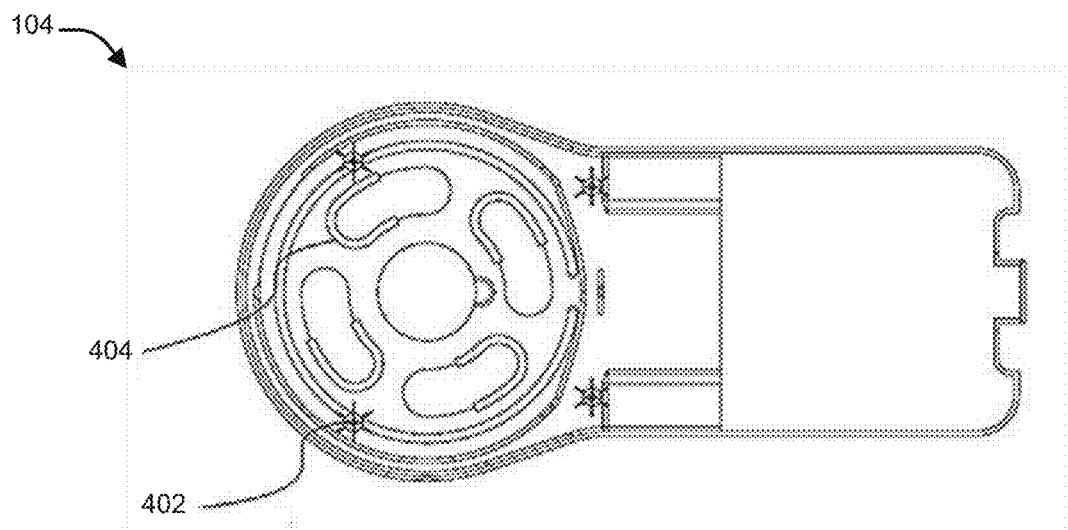

FIGS. 4A and 4B illustrate exemplary perspective view and top view of top panel of the grinder housing 104. The top panel 400 can be made of a plastic or a metal and fixed to a bottom panel using screws 402. Top side of the top panel 400 incorporates bottom pan locking grooves 401 (also referred to as locking groves) for locking the bottom pan 300 with the top panel 400 of grinder housing 104. A part of periphery of each of the locking grooves 401 is configured with locators 404 that locate the locking legs 302 in locking grooves 401 when the bottom pan 300 is assembled with the grinder housing 104. Further, a shaft opening 403 is provided in center for shaft rotational and up-down movement.

Figure 5:
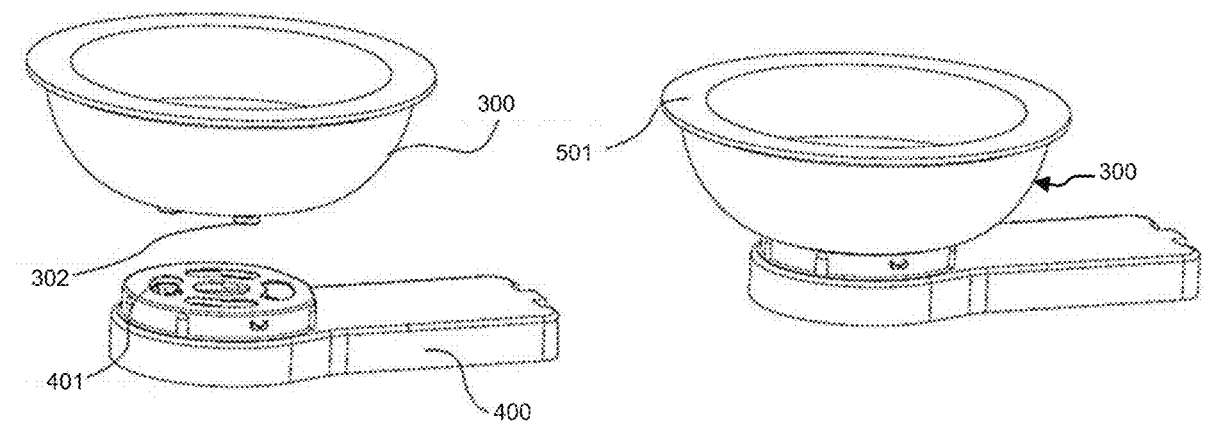
FIG. 5 illustrates an exemplary perspective view showing assembly of bottom pan with top panel of grinder housing, in accordance with an embodiment of the present disclosure.

FIG. 5 illustrates an exemplary perspective view showing assembly of bottom pan with top panel of grinder housing. As shown, when the bottom pan 300 is assembled with the grinder housing 104, the locking legs 302 of the bottom pan 30o are placed in the bottom pan locking grooves 401 and the bottom pan 300 is turned in clockwise direction for locking. If user wants to unlock the bottom pan 300 for washing or other purposes, he has to turn it in anti-clockwise direction. In an embodiment, top of the bottom pan 300 includes choke 501 for preventing leakage of microwaves during working.

Figure 6:
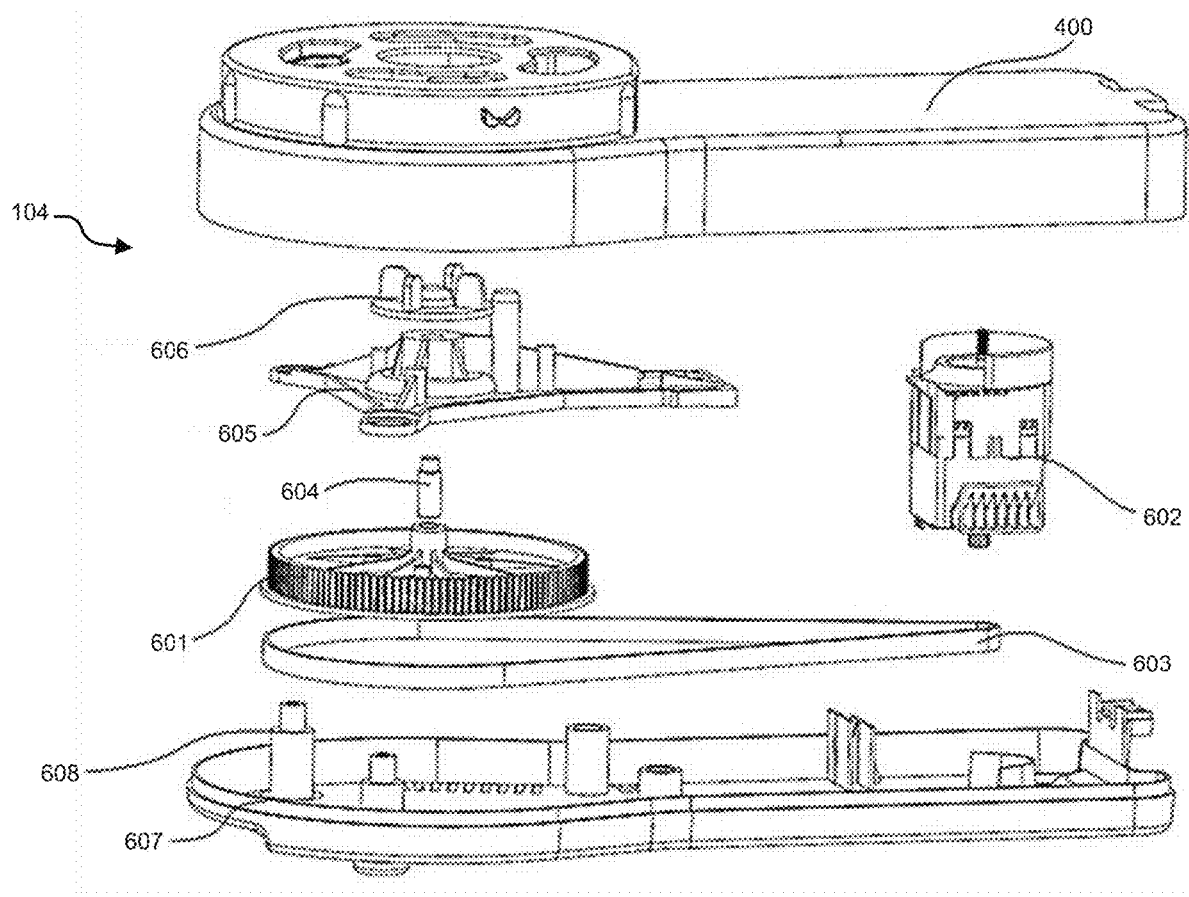
FIG. 6 illustrates an exemplary exploded view of grinder housing showing details of a first embodiment in respect of motor location, in accordance with an embodiment of the present disclosure.

FIG. 6 illustrates an exemplary exploded view of grinder housing showing details of the mechanism for driving the mixer blade, wherein in a first embodiment shown in FIG. 6, the motor 602 to drive the rotating coupler 606 that drives the mixer blades can be located away from axis of the rotating coupler 606, with drive from the motor 602 transferred to the rotating coupler 606 through a belt 603 over a small gear wheel fitted on motor shaft and a wheel 601 fixed to a spindle 604 to which the rotating coupler 606 is coupled. The spindle can be supported by a bracket 605 and all these components of the mechanism can be enclosed within the top panel 400 and a bottom panel 607 of the grinder housing 104. The top panel 400 and the bottom panel 607 are fitted together and locked using screws. The bracket 605 also provides support to the rotating coupler 606 and rests on a resting face 608 of the bottom panel 607.

When a user provides an input to run the mixer/grinder, a signal is received by the motor 602, which starts rotating and transferring the power to the wheel 602 through power transmission belt 603. The wheel 601 transfers power to the rotating coupler 606 through the spindle 604. Rotational speed of the coupler 606 can be control by controlling input power of motor.

Figure 7:
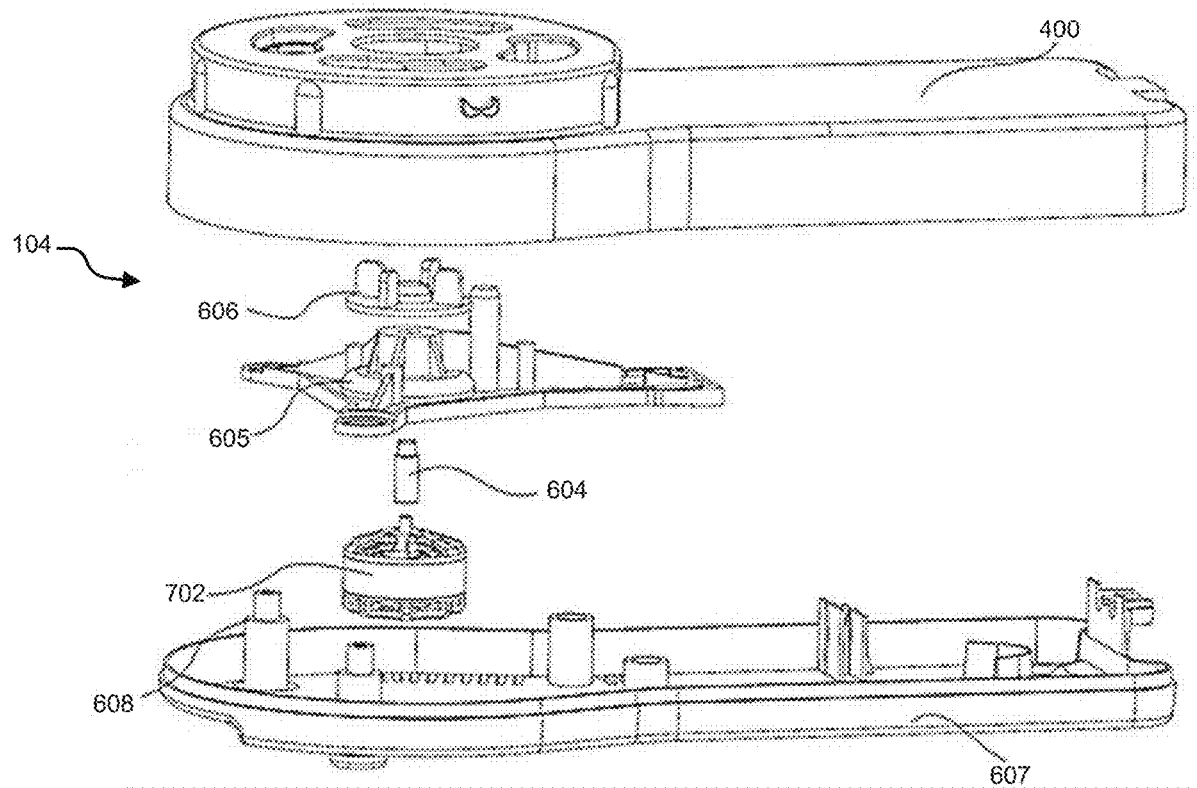
FIG. 7 illustrates an exemplary perspective view of proposed grinder housing showing details of a second embodiment in respect of motor location, in accordance with an embodiment of the present disclosure.

FIG. 7 illustrates an exemplary perspective view of proposed grinder housing showing details of a second embodiment in which a motor 702 is directly coupled to the spindle 604, and therefore, the mechanism does not require the wheel 601 and the belt 603. The motor 702 is fitted inside the bottom panel 607 coaxially with the spindle 604. The spindle 604 is fixed to the motor from one side and fixed to the rotating coupler 606 on the other side.

Figure 8A:
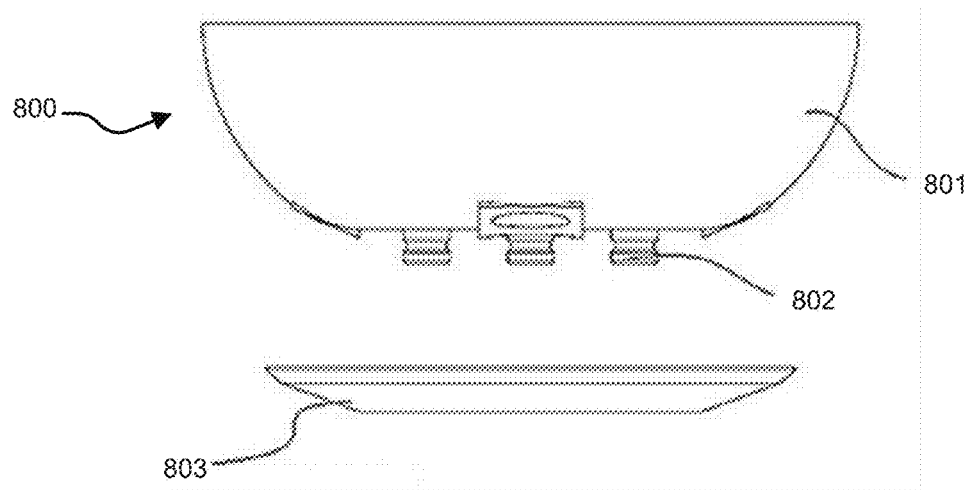
FIGS. 8A and 8B illustrate exemplary perspective view and side view respectively of bottom pan with induction coil, in accordance with an embodiment of the present disclosure.
Figure 8B:
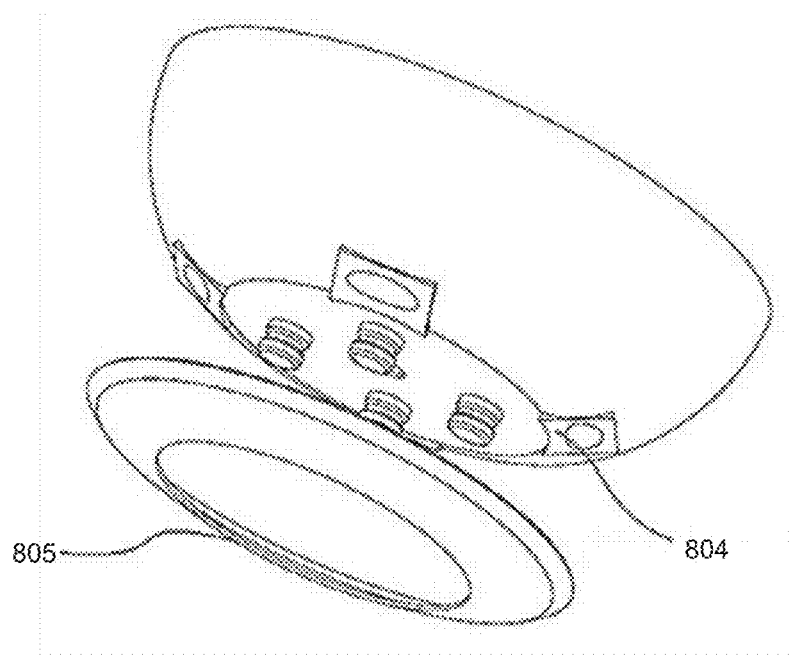

FIGS. 8A and 8B illustrate exemplary perspective view and side view respectively of a bottom pan with induction coil. As shown the bottom pan 800 can comprise of two parts: a bottom pan enclosure 801 and a bottom pan resting plate 803. One or more induction coil resting grooves 804 are provided on periphery of the bottom pan enclosure 801 for accommodating one or more induction coils. Induction coils can be sandwich between bottom pan enclosure 801 and the resting plate 803. A circular cutout 804 is provided in center of the bottom pan resting plate 803. As before the bottom pan 800 can include a plurality of locking legs 802 to lock the bottom pan 800 with the grinder housing 104.

In an embodiment, electric power supply to the induction coils located in the bottom pan 800 can be provided through the locking legs 802, wherein when the bottom pan 800 is locked with the grinder housing 104, they can connected with a source of electric power in the grinder housing 104. It is, however, possible to have other solutions to provide electric power to the induction coils.

Figure 9A:
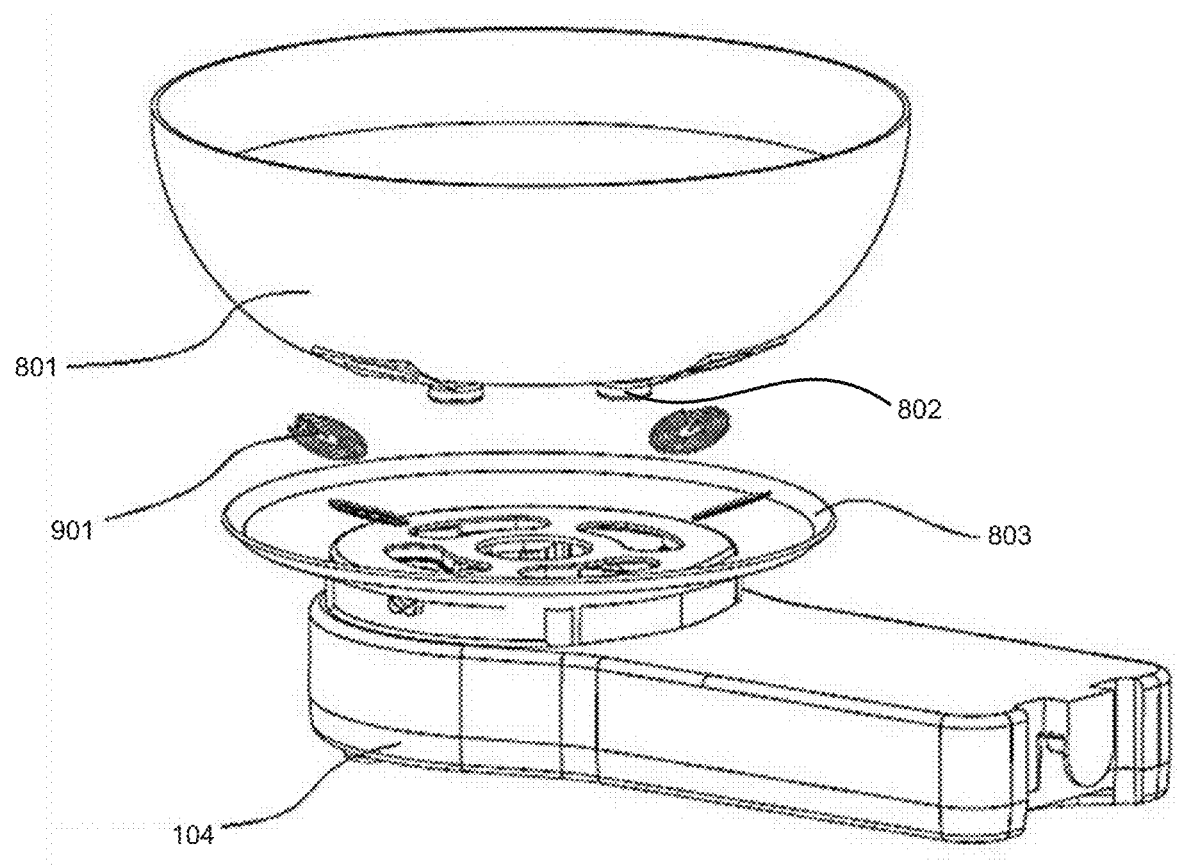
FIG. 9A illustrates an exemplary perspective view showing assembly of bottom pan, induction coil with grinder housing, in accordance with an embodiment of the present disclosure.

FIG. 9A illustrates an exemplary perspective view showing assembly of the bottom pan 800 having induction coils 901, with grinder housing 104. As shown, the bottom pan enclosure 801 gets lock with the grinder housing 104 through the locking legs 802. Induction coils 901 are configured with electronic circuit for heating contents inside the bottom pan 800.

Figure 9B:
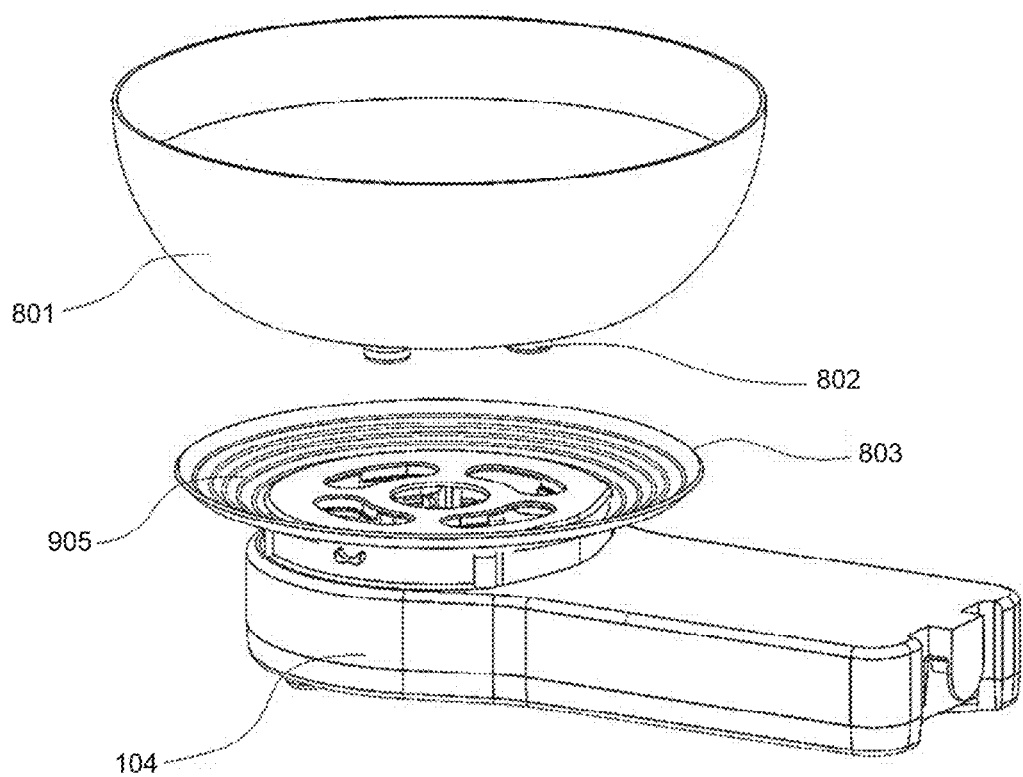
FIG. 9B illustrates an exemplary perspective view showing an alternate arrangement of induction coil in the bottom pan, in accordance with an embodiment of the present disclosure.

FIG. 9B illustrates an exemplary perspective view showing an alternate arrangement of induction coil in the bottom pan 800. As shown, the resting plate 803 can support a curved induction coil 905 that matches external profile of the bottom pan enclosure 801. As shown, the bottom pan enclosure 801 gets lock with the grinder housing 104 through the locking legs 802. Induction coils 901 are configured with electronic circuit for heating contents inside the bottom pan 800.

Figure 10:
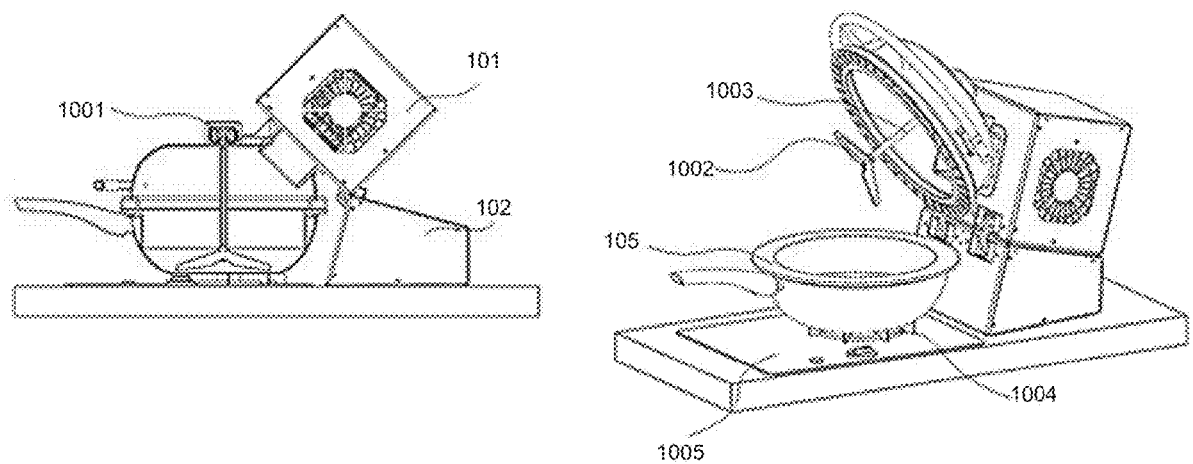
FIG. 10 illustrates an exemplary perspective view showing a top pan that incorporates a grinder/mixer, in accordance with an embodiment of the present disclosure.

FIG. 10 illustrates an exemplary perspective view showing a top pan that incorporates a grinder housing 1001. The grinder housing 1001 comprises mechanism for driving a mixer blade 1002 that projects downward from the top pan. In an aspect, a base 1005 provides a heat source 1004 to enable induction or open flame cooking from bottom side of a bottom pan and from top side grinder housing provides a various operation like grinding, mixing, blending, stirring simultaneously or independently. As before, the top pan is coupled with a magnetron or microwave producing device housed within a top housing 101 pivotally fixed to a bottom housing 102. The magnetron or microwave producing device enables microwave based cooking in addition to traditional cooking by external heating by the heat source 1004, and the mixer blade 1002 simultaneously enables various operations like blending, stirring, grinding etc While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

I claim:
1. A multifunctional food processor comprising:
   a grinder housing having a mechanism for driving a grinding blade; and
   a bottom pan adapted to be detachably attached to the grinder housing, and incorporating the grinding blade, wherein the bottom pan, when attached to the grinder housing, gets coupled to the mechanism for driving the grinding blade;

a top pan configured for pivotal movement between a lowered position in which the top pan rests over and in contact with the bottom pan to cover the bottom pan such that the top pan and the bottom pan together form an enclosed cooking space, and a raised position in which the top pan moves away from the bottom pan to allow access to the bottom pan;

wherein the top pan is coupled with at least one microwave producing device for pivotal movement along with the top pan; and wherein the at least one microwave producing device acts as a source of microwaves, thereby allowing contents of the bottom pan to be heated in addition to any one or more of stirring, blending, grinding.

2. The food processor of claim 1, wherein the food processor further comprises:
   a base plate;
   a bottom housing placed over the base plate;
   a top housing pivotally coupled to the bottom housing and housing the at least one microwave producing device; wherein the top pan is attached to the top housing, and wherein the pivotally attached top housing pivotally moves between a raised position in which the top housing rests on a resting face of the bottom housing, and a lowered position in which the top pan attached to the top housing rests over the bottom pan and covers the bottom pan.

3. The food processor of claim 2, wherein the enclosed cooking space created in the lowered position of the top housing and the attached top pan is configured for holding food items, and for any or a combination of heating, stirring, blending, and grinding.

4. The food processor of claim 2, wherein the top pan is coupled to the top housing through a wave guide, wherein the wave guide guides microwaves generated by the at least one microwave producing device for transfer of the microwaves from the at least one microwave producing device to the bottom pan.

5. The food processor of claim 1, wherein the bottom pan and the top pan are of a hemispherical shape to enable reflection of microwaves inside the bottom pan and the top pan for efficient cooking.

6. The food processor of claim 1, wherein the bottom pan is detachably attached to the grinder housing through a plurality of locking legs provided on a bottom side of the bottom pan, and a plurality of corresponding locking grooves provided on a top surface of the grinder housing.

7. The food processor of claim 1, wherein the grinding blade is driven by a motor located in the grinder housing.

8. The food processor of claim 7, wherein the motor is fixed in the grinder housing coaxially with the grinding blade.

9. The food processor of claim 7, wherein the motor is fixed in the grinder housing at a position away from the grinding blade, and drive from the motor to the grinding blade is transmitted through a belt.

10. The food processor of claim 7, wherein the food processor includes one or more power transformers, located within the bottom housing, for regulating input power to the at least one microwave producing device, and to the motor for driving a mixer grinder blade.

11. The food processor of claim 1, wherein the top housing incorporates a display screen on a front face for user interface.

12. The food processor of claim 1, wherein the food processor is configured to allow simultaneous or iterative use of any or a combination of heating, stirring, blending and grinding.

13. The food processor of claim 2, wherein the top housing comprises a plurality of vents for a fan that is configured in the top housing.

14. The food processor of claim 1, wherein a top of the bottom pan includes choke for preventing leakage of microwaves during working.

15. The food processor of claim 1, wherein the food processor is configured as a remotely operable device through any or a combination of Internet, Wi-Fi, Bluetooth, Zigbee, and Near-Field Communication (NFC).

* * * * *